June 1, 1965  A. F. RHODES ETAL  3,186,486
WELL COMPLETION
Filed Feb. 24, 1959  11 Sheets-Sheet 10

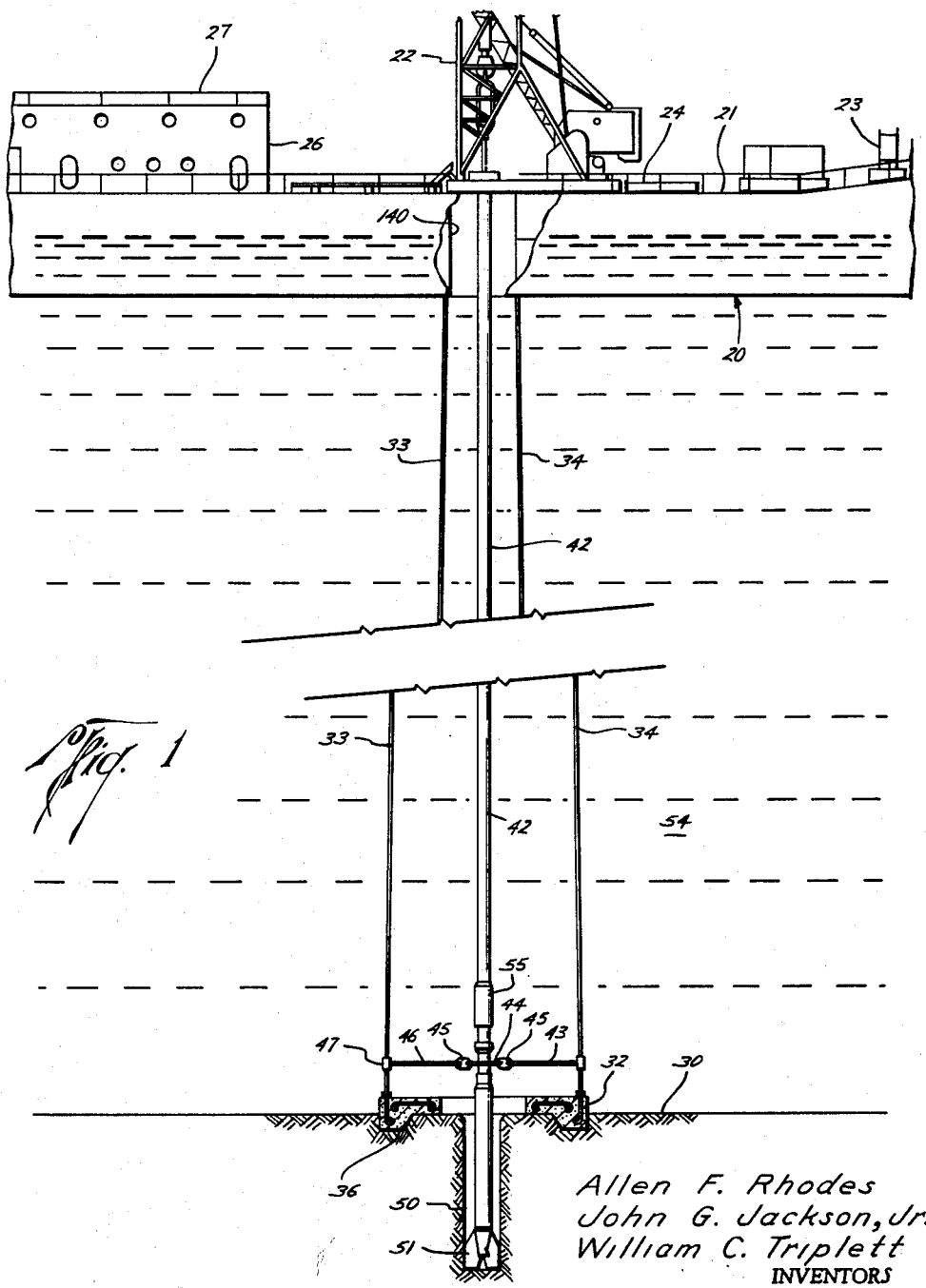

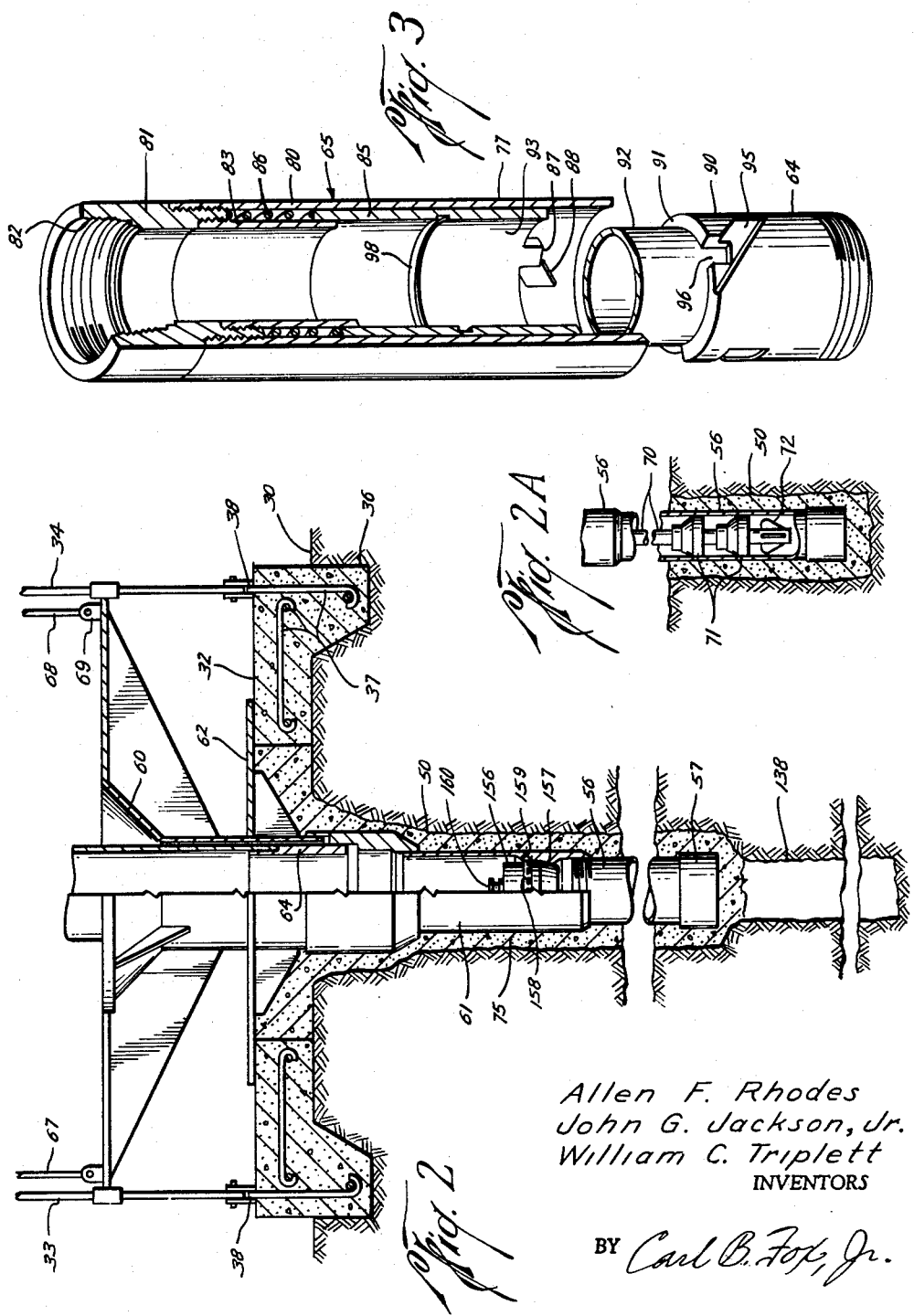

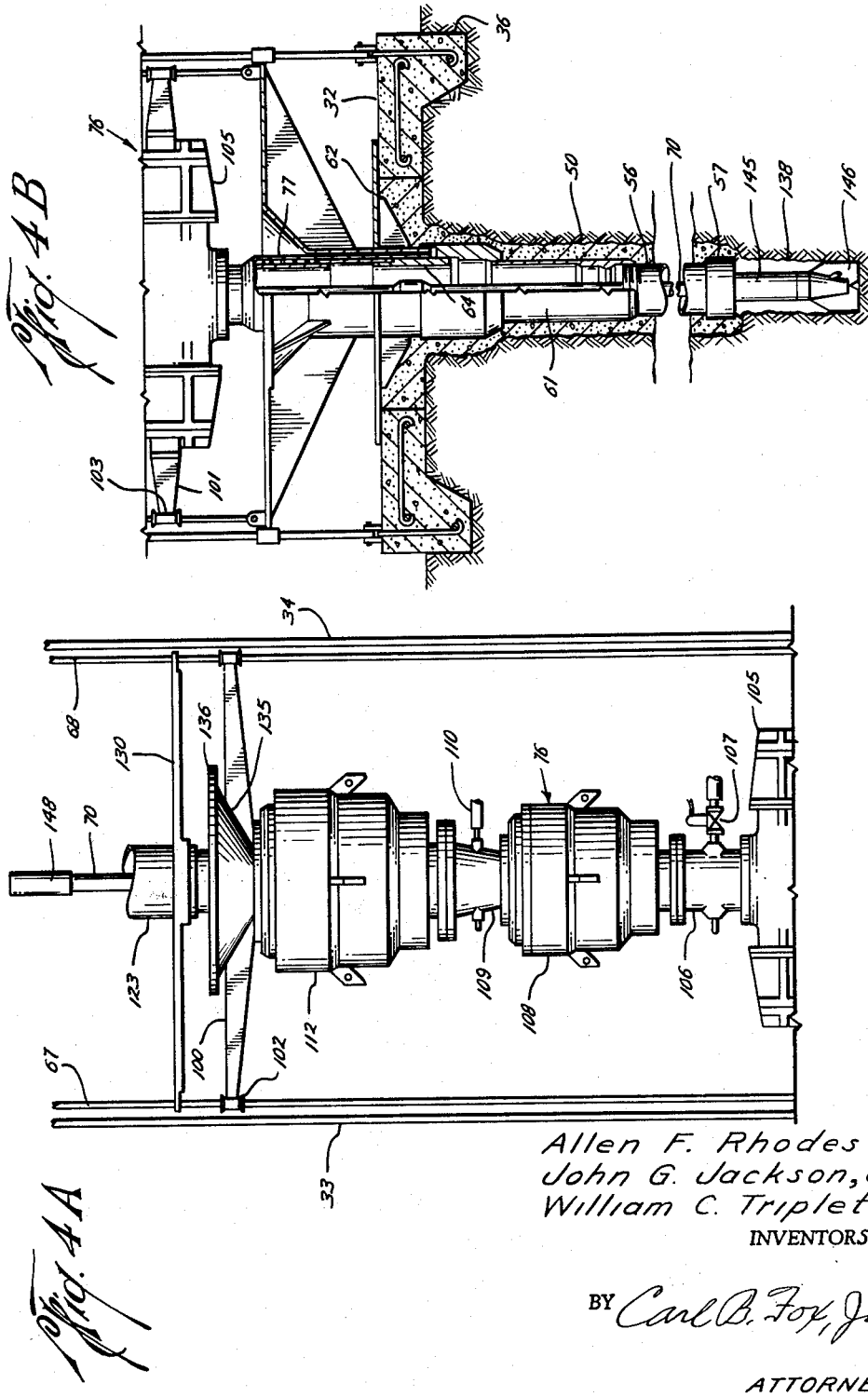

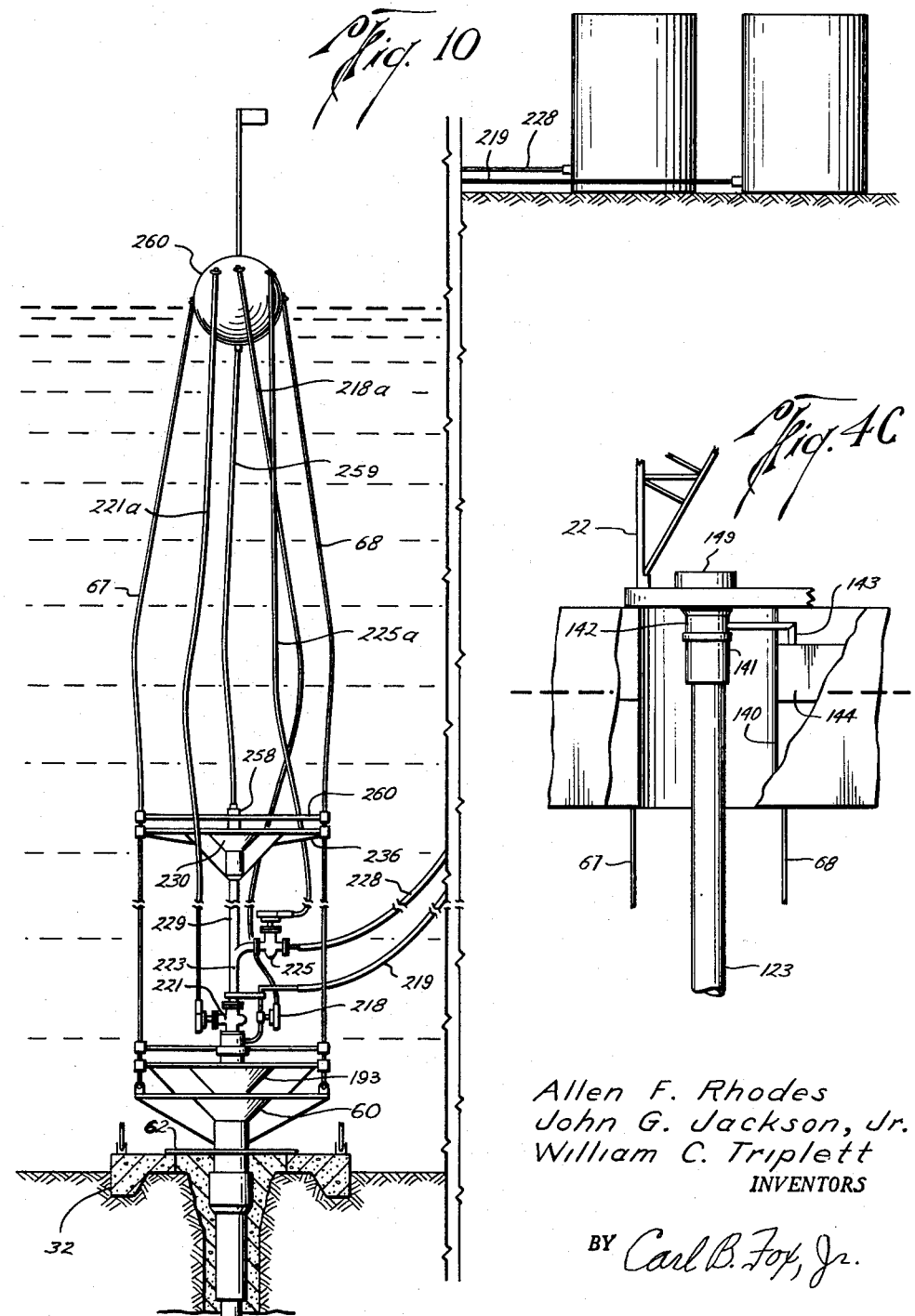

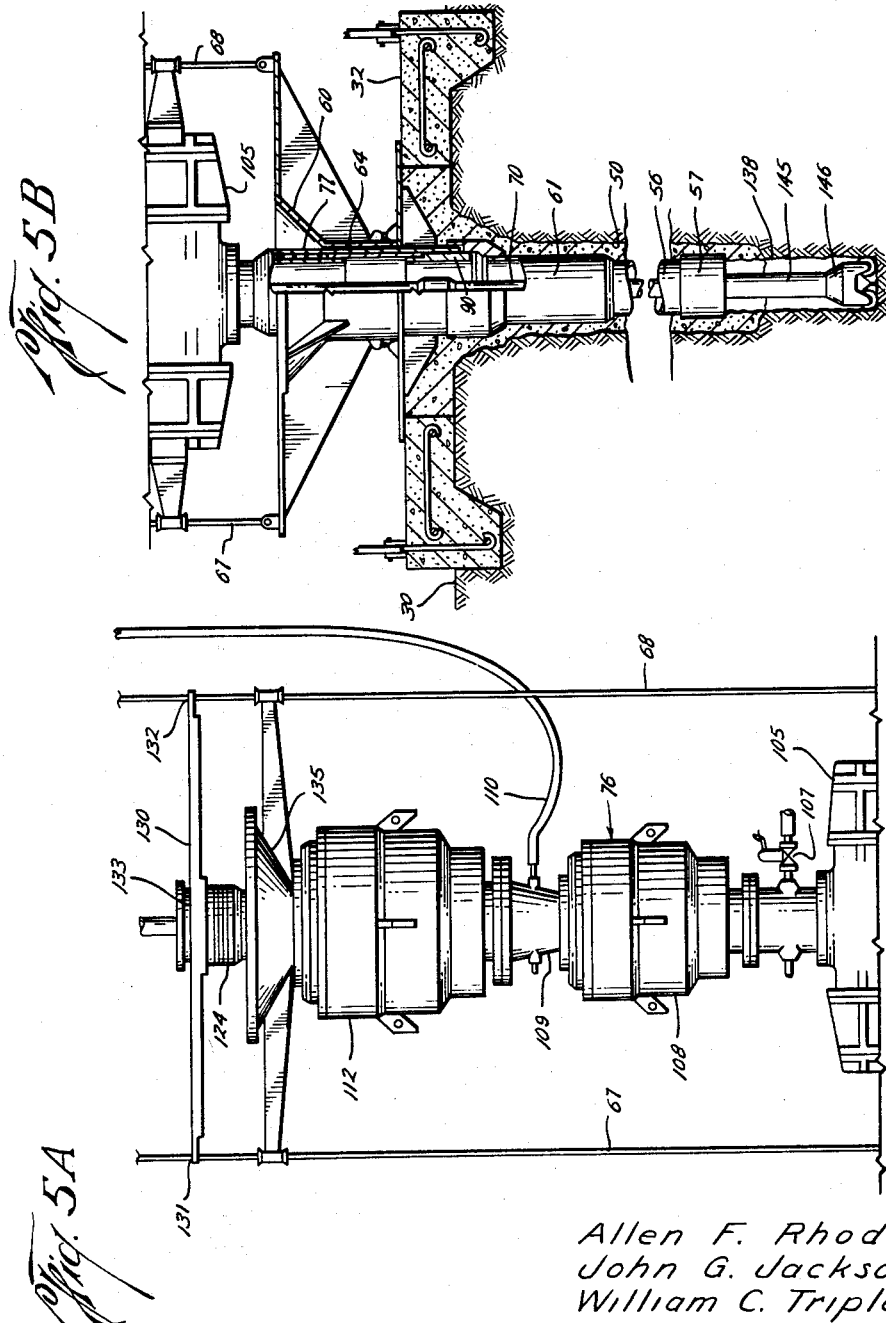
Allen F. Rhodes
John G. Jackson, Jr.
William C. Triplett
INVENTORS
BY Carl B. Fox, Jr.
ATTORNEY

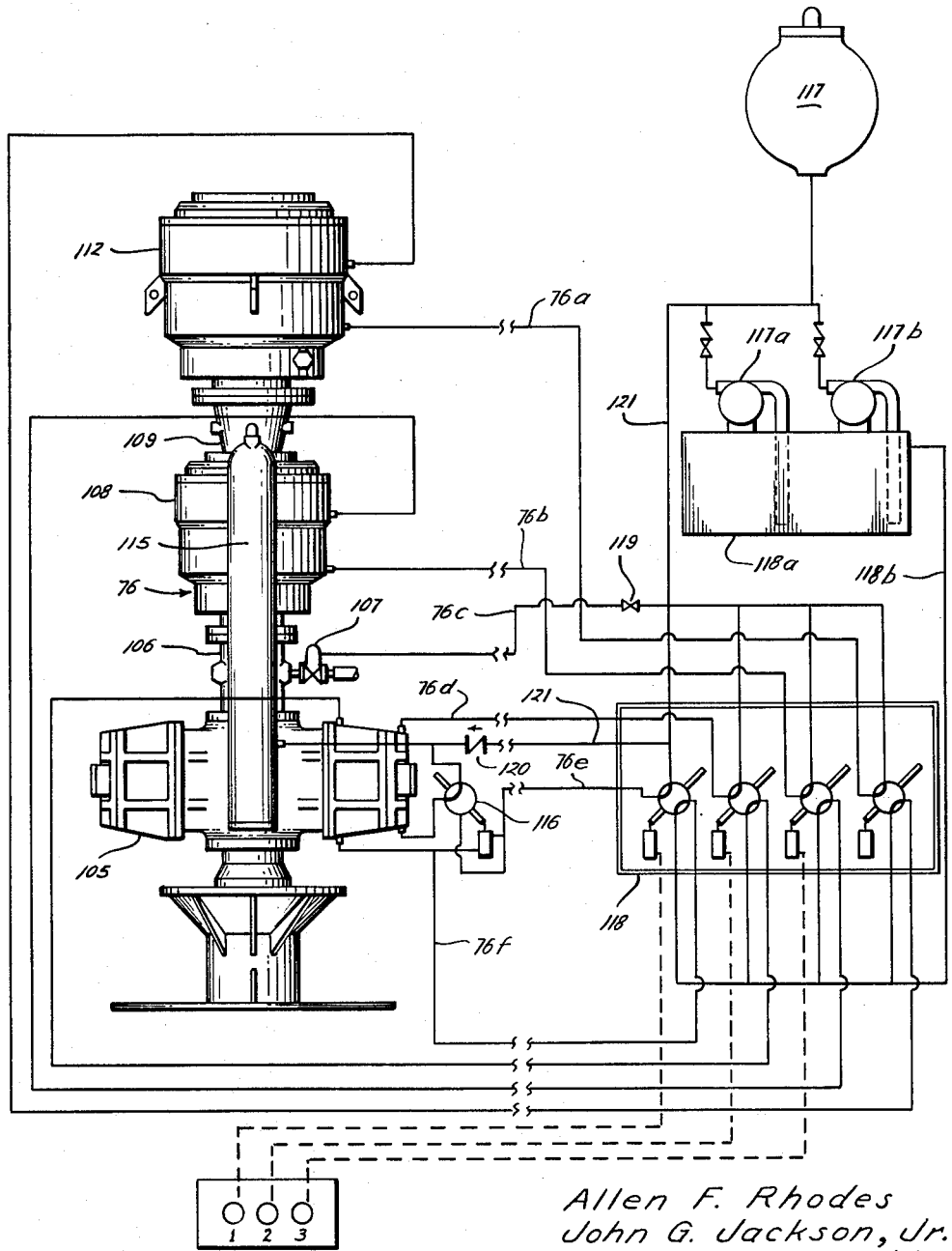

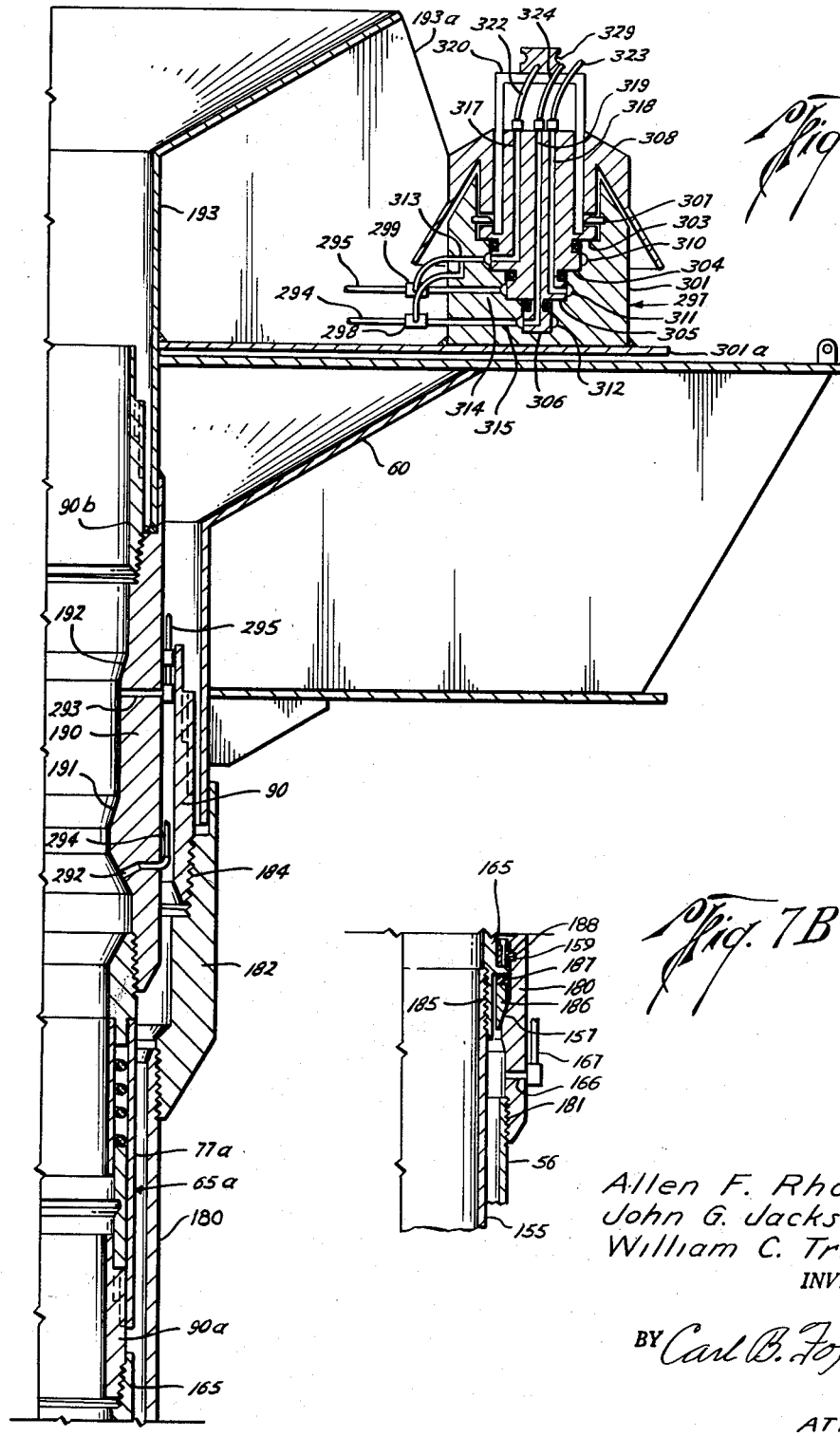

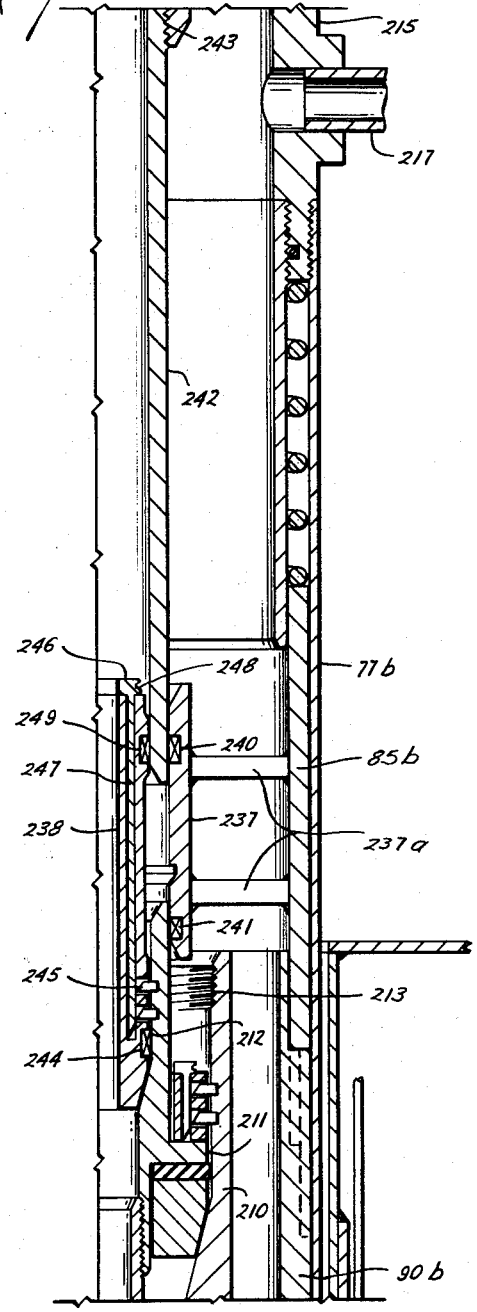
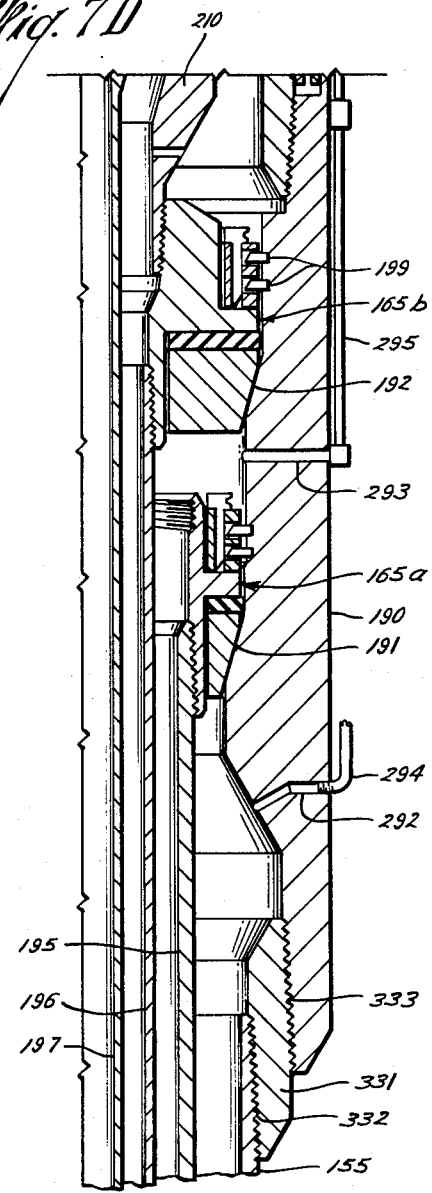
Allen F. Rhodes
John G. Jackson, Jr.
William C. Triplett
INVENTORS

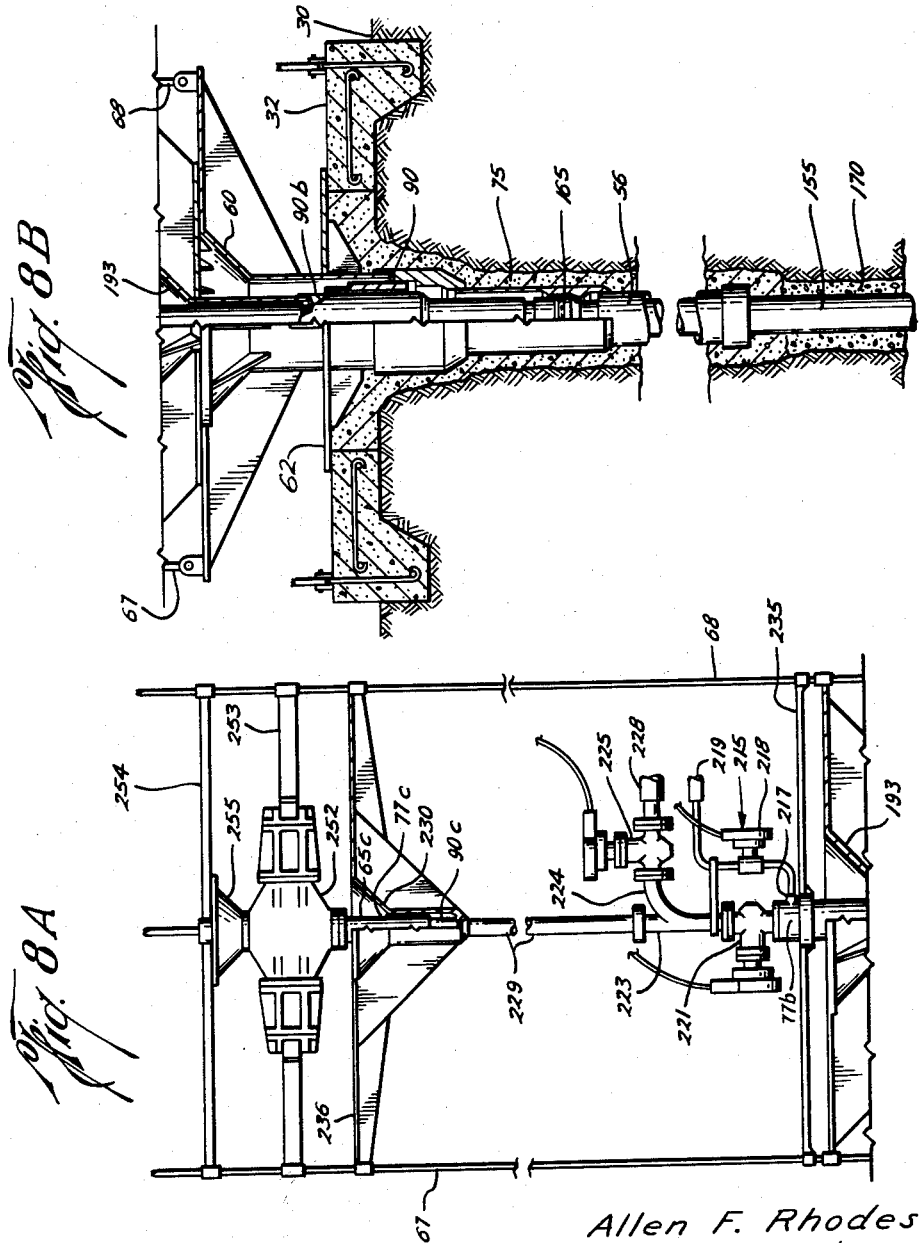

Allen F. Rhodes
John G. Jackson, Jr.
William C. Triplett
INVENTORS

BY Carl B. Fox, Jr.

ATTORNEY

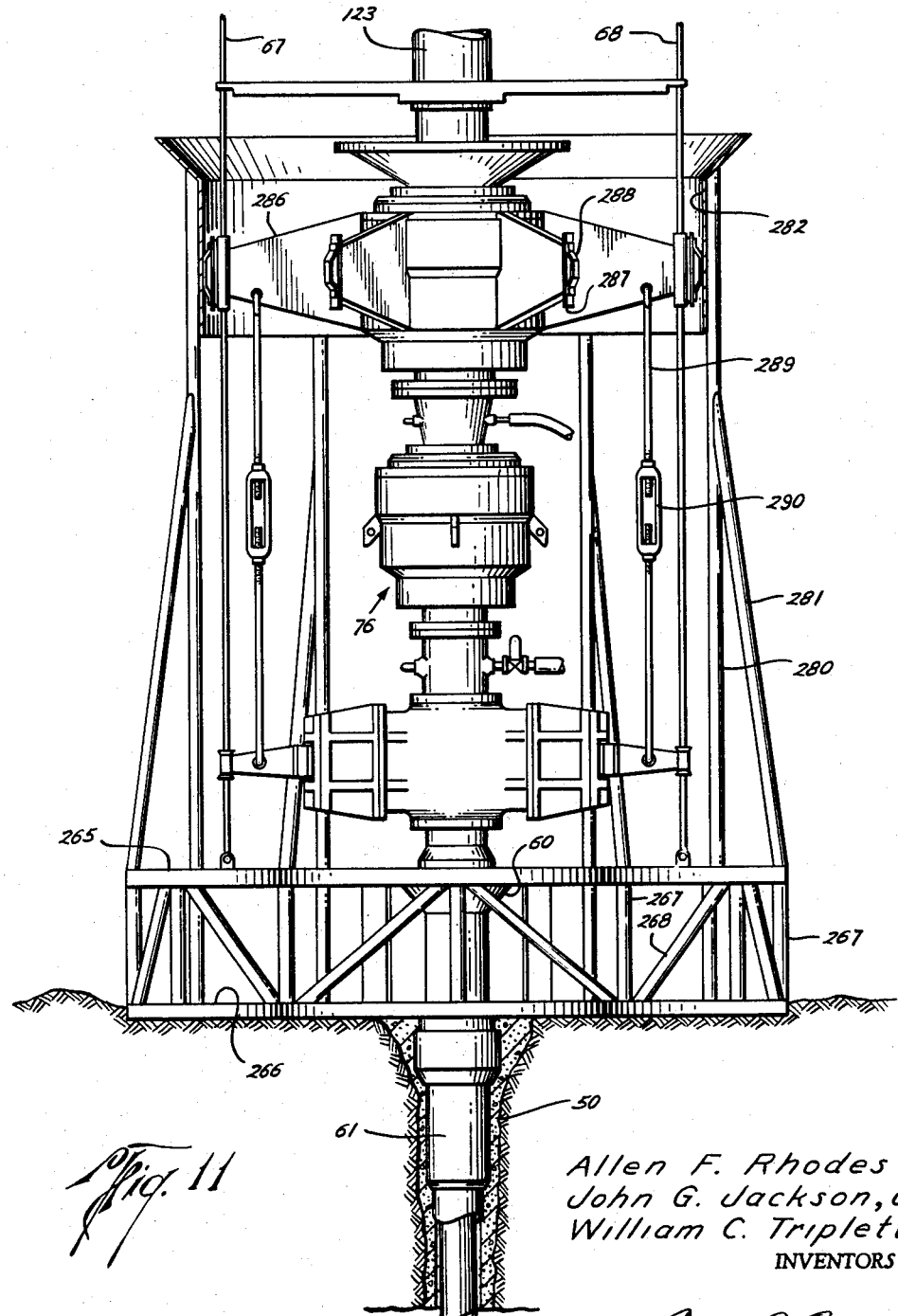

United States Patent Office 3,186,486
Patented June 1, 1965

3,186,486
WELL COMPLETION
Allen F. Rhodes, Houston, John G. Jackson, Jr., Angleton, and William C. Triplett, Corpus Christi, Tex. (all % McEvoy Company, P.O. Box 3127, Houston, Tex.)
Filed Feb. 24, 1959, Ser. No. 795,105
6 Claims. (Cl. 166—66.5)

This invention pertains to methods and apparatus for underwater wells. The invention contemplates such features in connection with underwater wells as drilling, completion, production, maintenance, and workover operations.

A principal object of the invention is to provide satisfactory methods and apparatus for creation and completion of oil wells beneath a body of water.

Another object of the invention is to provide an underwater well completion which can be reworked and from which the separate components can be removed, overhauled, and/or replaced.

The completion would further provide control of the well during all steps of the method and during all steps of assembly of the apparatus, and such are also objects of the invention.

Another object of the invention is to provide methods and apparatus wherein the completion may be opened for access therethrough by conventional wire line methods or other suitable manner.

Another object is to provide such methods and apparatus including a boat, barge, or other float, whereby the operations may be controlled and/or performed at the water surface.

A further object of the invention is to provide methods and apparatus for creating and completing wells which are satisfactory for the complete operations of creating and completing wells, for operations after completion of the wells, and which are convenient, of reasonable cost, and relatively simple.

Briefly, the invention contemplates methods and apparatus for completion of underwater wells. A boat or other floating vessel carries substantially all apparatus necessary for performing the method and for assembling the apparatus. The boat has an opening through its decks and hull through which the underwater operations are performed. Guide lines are included for lowering of certain components of the apparatus to the bottom of the body of water. The well completion is removably assembled such that the entire completion or a part thereof may be removed, the latter enabling reworking of the well after completion and the recompletion of additional producing zones, and the removability characteristics of the completion components facilitating control of the well during both drilling and completion thereof.

Other objects and advantages of the invention will appear from the following description of preferred embodiments, reference being made to the accompanying drawings, of which:

FIGURE 1 is a side elevation, partly in vertical section, of a preferred form of apparatus according to the invention at one stage of assembly thereof, and illustrating the method of the invention during that stage of assembly, the portion beneath the break lines being enlarged;

FIGURE 2 is an enlarged partial elevation, partly in vertical section, showing the apparatus and method at a different stage of assembly;

FIGURE 2A is a partial vertical section showing the lower part of FIGURE 2 at a different stage of assembly;

FIGURE 3 is a perspective view of a connection element of the apparatus, a portion thereof being cut away to show features of the interior of the connection element;

FIGURES 4A and 4B are enlarged partial elevations, partly in vertical section, FIGURE 4A showing the upper portion, and FIGURE 4B the lower portion, of a part of the apparatus and method in a different stage of assembly;

FIGURE 4C is a partial elevation, partly in vertical section, showing equipment at the floating vessel in conjunction with the showing of FIGURES 4A, 4B;

FIGURES 5A and 5B are like FIGURES 4A, 4B, showing the apparatus and method at still another stage;

FIGURE 6 is an elevation, including a portion thereof shown as a schematic represenation, of a secondary assembly of the apparatus;

FIGURES 7A and 7B are, respectively, partial vertical sections showing the upper and lower portions of the apparatus and method at still another stage of assembly, for one size of surface casing;

FIGURES 7C and 7D are similar to FIGURES 7A, 7B, showing an alternative form in which a smaller surface casing is used;

FIGURES 8A and 8B are partial elevations, partly in vertical section, showing the upper and lower parts, respectively, of another condition of the apparatus and method;

FIGURE 10 is an elevation, partly in vertical section, showing the apparatus in its final form, the underwater well being completed;

FIGURE 11 is a partial elevation, partly in vertical section, of a modified form of apparatus.

Figure 9:
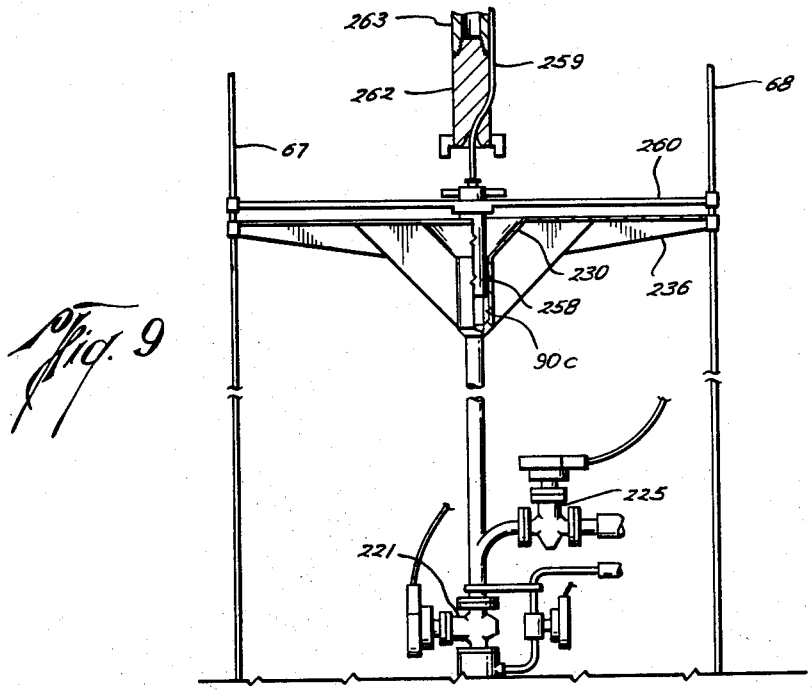
FIGURE 9 is a partial elevation, partly in vertical section, of apparatus and method at another stage.

Referring now in detail to the drawings, the apparatus and method will be described simultaneously. A floating vessel 20 carries, usually on its main deck 21, a derrick or drilling mast 22 as support means for use in drilling, completion, or workover of a well. The floating vessel 20 may be of any type suitable for transporting over a water surface the personnel and the equipment herein described, and for supporting same during use in the manner described according to the method. Floating vessel 20 carries auxiliary apparatus including the mooring winches 23, a plurality of which are provided, reels 24 for hoses, to be described, cabins 26 for technical personnel and crew, a helicopter landing platform 27 atop the cabins, and stored materials (not shown) used in drilling and completing the well, and in maintaining the personnel, such as drilling mud and components thereof, cement, fresh water, provisions, and the like, and miscellaneous equipment such as mud pumps, tanks, test equipment, hoisting equipment, cranes, logging units, anchors, cement pumps, offices and equipment therefor, galley and equipment therefor, and the like. In other words, vessel 20 is fitted out with the usual equipment for comfort and safety of the personnel and operations of the vessel, and the equipment necessary to carrying out the method to be described, and many other items not specifically mentioned are or may be included.

When a well is to be drilled at an underwater location, the floating vessel 20 (FIGURE 1) is floated upon the water surface to above the point at the water's bottom 30 at which the well is to be drilled, or the well site. After the vessel has been moored securely, a concrete guide ring 32, or base, is lowered to the underwater bottom on two parallel manila lines 33, 34, secured to vessel 20 at their upper ends. This ring serves as a base element through which the drill string is lowered, and as anchoring means for lines 33, 34.

Still referring to FIGURE 1, and also to FIGURE 2, ring 32 maintains its position on bottom 30 because of its weight, and has lower ring shaped flanged portion 36 which sinks into the mud at the bottom. Ring 32 is fabricated of steel rod reinforced concrete, the rods being designated by reference numeral 37, and continuations 38 of the rods above the ring are welded to the guide means (manila lines 33, 34) connections to anchor them to the ring. The drill string 42 (FIGURE 1) is guided through the center opening of ring 32 by a composite bit guide 43 engaging the drill string 42 and slidingly engaging the manila lines 33, 34. Guide 43 has a central ring 44 welded to two connector plates 45 in turn each welded to a laterally extending arm 46 having a tubular collar 47 carried at its extending end to slidingly receive one of the lines 33, 34. The arms 46 are coaxially aligned. Ring 44 is of a size large enough to fit loosely around the drill string assembly but small enough to prevent movement of the bit (to be described) therethrough. Ring 44 will ride upon the bit as the bit is moved from vessel 20 to ring 32 or from ring 32 to vessel 20. When the bit is beneath ring 32, guide 43 rests above ring 32 and the drill string is slidingly moved through ring 44. As string 42 is moved up or down, the collars 47 slide along lines 33, 34, and thereby the string 42 is guided centrally between the lines and through ring 32. This guiding action is effective at any intermediate point along the lines between vessel 20 and ring 32.

The initial segment 50 of the hole is drilled by a bit 51 carried at the lower end of drill string 42. Fluid circulation for the removal of cuttings from the hole is accomplished by pumping sea water through the drill string and out through the bit and allowing the circulating water and cuttings suspended therein, to exhaust from the hole into the body of water 54.

The initial segment of the hole is usually about 300 to 500 feet in vertical depth. To isolate the action of the waves which are transmitted to the drill string through the floating vessel 20, a sliding longitudinal connection 55 is installed intermediate the length of the drill string at a point above the bit. This permits the maintenance of a constant weight on the bit during drilling.

After the initial segment 50 of hole has been drilled, drill string 42, including the bit 51, is removed from the hole, and hoisted back along lines 33, 34 to aboard the floating vessel. A casing 56 (FIGURE 2) having an open guide shoe 57 carried at its lower end is lowered into the initial well hole 50, using a retrievable guide (not shown), similar to guide 43, which positions the lower end of the casing over the hole with relation to the manila guide lines 33, 34. A guide funnel 60 and casing supporting assembly 61 are carried at the upper end of the casing. The lower part of the guide funnel 60 is in the form of a horizontal ring flange 62 secured about the tubular lower part of the funnel and which rests on the upper surface of ring 32 and covers the center opening through the ring. Casing 56 is lowered into the well hole with the rig hoisting machinery aboard vessel 20 until the funnel 60 and casing supporting assembly 61 are attached to its upper end.

The casing assembly comprises, beginning at its lower end, the guide shoe 57, conductor casing 56, the casing supporting assembly 61 including the lower end 64 of a remote connection means, such as the safety joint 65 shown in FIGURE 3, installed inside the upper end of the casing supporting assembly, the flange landing base 62, guide funnel 60, and two or more guide cables 67, 68 connected to the guide funnel at perforate eyes 69 thereof. This combined assembly is lowered from the vessel to rest on concrete guide ring 32 by means of the guide cables 67, 68 or the drill pipe 42 attached to the assembly by said remote connection means 65 and supported at its upper end by the rig hoisting machinery aboard vessel 20. If drill pipe 42 is used to lower the assembly, the guide cables 67, 68 are nonetheless provided, but are allowed to slackly follow the assembly as it is lowered. If used, drill pipe 42 is disconnected at safety joint 65 and hoisted back aboard vessel 20 after assembly 61 is in place.

After the described assembly 61 is in place on ring 32, it is cemented in place. For this operation, a drill pipe 70 of conventional form but of smaller diameter than drill pipe 42, is run through assembly 61, the smaller drill pipe 70 carrying around its lower end one or more annular rubber seal cups 71 of conventional form to seal the annular space between the smaller drill pipe 70 and the interior of casing 56 (FIGURE 2A). A centralizer 72 is carried at the lower end of string 70. String 70 is guided through assembly 61 by guide means 43, heretofore mentioned, and a sliding connection (not shown) similar to sliding connection 55 is provided in the string. Cement is pumped through string 70 from vessel 20, the cement passing out of the lower end of casing 56 and guide shoe 57 to fill the hole space around casing 56 and assembly 61 up to ring 32 and plate 62. Cement is prevented from rising in casing 56 by sealing cups 71. After the resulting cement formation 75 (FIGURES 2A and 2) has hardened, the entire assembly in the hole is secured in place, and the next section of the hole below hole section 50 may be drilled therethrough.

Manila lines 33, 34 are cast off from vessel 20, or retrieved, after the guide cables 67, 68 are in place. Cables 67, 68 are used thereafter in the same manner as were the temporary manila lines.

After the conductor casing assembly 61 has been cemented in place and the cement mixture 75 has been given sufficient time to harden, a blowout control assembly 76 (FIGURES 4A, 4B, 5A, 5B) is lowered into place with drill string 70 and connected to the upper end of the conductor casing assembly with remote connection 65, previously mentioned. The lower part 64 of this safety joint 65 has been described previously as forming an upper part of the conductor casing assembly 61. The safety joint is shown separately in FIGURE 3. The upper part 77 of the safety joint forms a lower part of the blowout control assembly 76. The assembly is supported and lowered by a drill pipe which is connected to a conventional landing tool (not shown). The landing tool is grooved to provide a seat for the pipe rams in a lower ram-type blowout preventer of assembly 76. The pipe rams in the preventer are closed against the landing tool thereby providing a connection between assembly 76 and the drill pipe support. With such connection having been made, the assembly 76 is then lowered into position with the drill pipe which is in turn supported and controlled by the rig hoisting machinery aboard vessel 20.

Referring now to FIGURE 3, which shows the safety joint 65, upper part 77 of the safety joint includes an outer tubular barrel 80 which is screwed onto an upper connector 81, the upper connector having an upper threaded socket formation 82 for screwing onto other apparatus (e.g., assembly 76). A sealing barrel 83 is also screwed to connector 81 but at the inside thereof and spaced inwardly of outer barrel 80. A latching sleeve 85 is slidably disposed between outer barrel 80 and sealing barrel 83, and a helical spring 86 is disposed under compression between the lower end of connector 81 and the upper end of latching sleeve 85. Latching sleeve 85 has a plurality of downwardly projecting latching lugs 87 at its lower end for latching the barrel in place. A plurality of helical keys 88 formed on the interior surface of outer barrel 80 are each disposed with their upper end against a side of one of the latching lugs.

The lower part 64 of safety joint 65 includes a mandrel 90 having lower connection threads and an upwardly facing annular shoulder 91 above which the outer diameter of the mandrel is decreased. The decreased part 92 of mandrel 90 is slidingly receivable within the axial opening 93 of the latching sleeve 85, and the larger part of mandrel 90 is slidingly receivable within barrel 80. The larger part of mandrel 90 has helical grooves 95 formed therein which are spaced therearound to register with the helical keys 88 of outer barrel 80. A plurality of cooperable slots 96 are formed in shoulder 91 to receive the lugs 87 at the lower end of the latching sleeve 85.

Spring 86 permits latching sleeve 85 to be moved relatively upwardly upon contacting shoulder 91 as the two parts 64, 77 of the connection are telescopically moved together. Helical keys 88 first enter helical grooves 95 and cause upper connection part 77 to be rotated counterclockwise about its axis relative to lower connection part 64 as connection parts 64, 77 come together. Lugs 87 rotate slidingly along shoulder 91 as keys 88 move helically further into grooves 95, and after keys 88 are entirely within grooves 95, lugs 87 register with slots 96 and are snapped thereinto by downward compressive force of spring 86 on latching sleeve 85. Keys 88 are then locked within grooves 95, and the connection parts 64, 77 are maintained connected to resist and transmit tension, compression, and torsion forces thereacross. Although the safety joint is shown having upper and lower thread connection formations other types of connections may alternatively be provided.

Safety joint 65 may be released, in the conventional manner, by inserting a releasing spear carried at the end of a wire line (not shown) into the safety joint opening 93. The spear has spring actuated outwardly extending members which engage releasing spear groove 98 of latching sleeve 85, and when the spear is pulled upwardly by the wire line it moves latching sleeve 85 upwardly to compress spring 86 and remove the lugs 87 from slots 96 and thereby enable keys 88 to be moved out of grooves 95.

Blowout control assembly 76 has two pairs of oppositely disposed laterally extending arms 100, 101 which engage guide cables 67, 68 at perforate end collars 102, 103, respectively, to guide the blowout control assembly into position as it is lowered so that safety joint part 77 will engage over safety joint part 64 of assembly 61.

The blowout control assembly 76 (FIGURES 4A, 4B, 5A, 5B) comprises safety joint part 77 on the bottom connected to a double control gate, hydraulic operated ram type blowout preventer 105 on top of which is connected a mud control spool 106 having a remote operated valve 107 installed on a side outlet of the spool. Above the spool is connected a bag type hydraulic operator blowout preventer 108 on top of which is connected a mud return spool 109 with a mud return hose 110 connected to a side outlet of the spool. Mounted on top of the spool 109 is another bag type hydraulic operated blowout preventer 112, but of a lower working pressure rating than preventer 108.

Referring now to FIGURE 6, blowout control assembly 76 is powered and operated from a remote location by means of hydraulic pressure. The blowout control assembly 76, previously described consists of five hydraulically operated units as follows: the first unit comprises blind rams with shear blades at the lower end of the double control gate ram-type blowout preventer 105; the second unit comprises pipe rams in the upper portion of double control gate ram-type blowout preventer 105; the third unit comprises bag type blowout preventer 108 located immediately above the mud control spool 106; the fourth unit comprises low pressure bag type blowout preventer 112 located immediately above the mud return spool 109, and used for sealing purposes only; the fifth unit comprises remote hydraulically operated gate valve 107 connected to a side outlet in the mud control spool 106.

In addition to these items, there are attached to the submerged blowout control assembly 76, two gas charged hydraulic accumulators 115, only one being shown in FIGURE 6, and a piston actuated three-way remote control valve 116 located underwater adjacent blowout preventer 105. Operation of all of the hydraulically operated units except the blind rams (of blowout preventer 105) is controlled by the action of hydraulic fluid channeled from the hydraulic pressure accumulator unit 117 which is aboard vessel 20 and directly connected by fluid lines to the underwater operating units through the bank of control valves 118. The control valves 118 are four-way pipe valves arranged as shown in the drawings to channel hydraulic fluid into the opening chambers of the blowout preventer units when in one position and into the closing chambers of these same units when in the other position. Operation of the gate valve 107 connected to the side outlet of the mud control spool 106 is controlled by hydraulic pressure for opening and is closed by a spring when hydraulic pressure is released. This unit is controlled by a single valve 119 shown in FIGURE 6.

Operation of the blind rams in the lower portion of the ram type blowout preventer 105 is powered through two hydraulic accumulators 115 mounted on the blowout control assembly and controlled by the piston actuated three-way remote control valve 116. Operation of this portion of the system is such that, with the check valve 120 in the supply line 121 from the hydraulic source 117 on the vessel to the hydraulic accumulators 115 attached to the blowout control assembly 76, as shown in FIGURE 6, all hydraulic control lines between the vessel and blowout control assembly can be broken after the three-way remote control valve 116 has been operated to close the blind rams, and these rams will remain closed under hydraulic pressure held within accumulators 115 for a considerable period of time (until leaks result in substantial dissipation of the pressure). This feature permits immediate closure of the well hole in any type of emergency. It is particularly valuable in cases where one of the vessel's mooring lines is severed and the vessel begins to drift off location. In such a situation the blind rams of the ram type blowout preventer 105 can be closed, and the action of the shear blades on these rams will sever a pipe in the hole running through preventer 105 and the rams will seal the hole. The hole is then protected and formation pressures controlled by the closed blind rams under the hydraulic pressure within the accumulators attached to the blowout control assembly.

The hydraulic control lines which extend from vessel 20 to blowout control assembly 76 are indicated by reference numerals 76a, 76b, 76c, 76d, 121, 76e, 76f, the function of each of which will be apparent from the showing of FIGURE 6. The break indications in these lines indicate the locations of the elements of FIGURE 6, those to the left hand side of the breaks being parts of assembly 76 and submerged therewith, those to the right hand side of the breaks being aboard vessel 20, the connecting lines communicating therebetween through the water. The break indications in the drawing also indicate the lines which are exposed to being broken, as mentioned above.

The hydraulic liquid tank 118a contains a supply of hydraulic liquid, and receives return thereof from control valves 118 through return manifold pipe 118b. Hydraulic liquid is pumped from tank 118a by dual pressuring pumps 117a, 117b, each of which provides a safety pumping facility in case of failure of the other. The hydraulic liquid pumped by pumps 117a, 117b is delivered to hydraulic pressure accumulator unit 117 and/or into line 121.

Blowout preventer 112 is used to provide sealed connection with a mud return hose 123 (FIGURE 4A) or with a rotating seal 124 (FIGURE 5A) as desired. These sealed connections are of a form conventional in the art. A guide means 130, having perforate ends 131, 132 receiving guide cables 67, 68, and having a central opening 133 to receive mud return hose 123 or rotating seal 124, is provided for guiding the hose or seal into the upper end of preventer 112, which is then closed therearound to form a sealed connection.

An upwardly facing conical guide funnel 135 is welded around the upper axial opening of preventer 112 to assist entry of pipes or equipment thereinto. A flange 136 about the upper end of the conical part of the funnel provides reinforcement against shock of landed equipment. The two opposite guide arms 100, previously mentioned, are welded to opposite sides of funnel 135 as well as to the upper surface of preventer 112.

The next step, preparatory to drilling the next hole section 138 below upper hole section 50, is to install the mud return hose 123 (see FIGURES 4A, 4B). The hose is reeled off of a hose reel 24 aboard vessel 20 and lowered through the well 140 beneath derrick 22 to bottom. The guide means 130 near the lower end of the hose slides down cables 67, 68 to assure entry of the lower end of the hose into funnel 135 and preventer 112. Preventer 112 is then closed about the hose to provide a closed passage through the hose and preventer assembly 76. At the upper end of hose 123, at vessel 20 (see also FIGURE 4C), there is provided a sliding connection 141, to absorb motion of vessel 20 on the water, and thereabove a bell return nipple 142 having side outlet 143 for discharge of fluids passing up through hose 123 to a tank 144 aboard vessel 20.

With mud return hose 123 in place, suspended from vessel 20 within well 140 and beneath derrick 22, the next segment or section 138 of the hole is drilled (FIGURES 4A, 4B) by running drill string 70, with drill collars 145 and drill bit 146 carried at its lower end, through hose 123, blowout preventer assembly 76, assembly 61, and casing 56, string 70 being supported and operated by the equipment aboard vessel 20. The drilling commences by drilling through cement 75 within casing 56 and shoe 57, after which drilling may be continued to the desired depth of hole segment 138. A second sliding connection 148 is provided in the drill string above assembly 76 to further isolate the drill bit from vessel motion, this second sliding connection being analogous to sliding connection 55 of FIGURE 1. The sliding connections permit a constant weight on bit 146 to be maintained during drilling regardless of motion of vessel 20.

Drill pipe 70, at its upper end at vessel 20, is connected to means 149 on the floating vessel for rotating the drill string to drill the well, to support weight of the assembly, and to provide for the circulation of drilling fluid under pressure in the conventional manner. Circulation of the drilling fluid is accomplished in a conventional manner from mud pumps carried aboard the vessel to the drill bit at the bottom of the hole. Drilling fluid, and cuttings suspended therein, are circulated from the drill bit up through the annular space between the drill pipe and hole, through the conductor casing assembly and blowout control assembly, and through the mud return hose, and are returned to mud tanks (not shown) aboard the vessel through side outlet 143 of bell return nipple 142 and through tank 144 (see FIGURE 4C).

Drilling can proceed in this manner until such hole depth is reached at which it becomes desirable to set an additional string 155 (FIGURE 8B) of casing. At this stage of operations, or prior to this time, if it is desirable to remove the blowout control assembly 76 (FIGURES 4A, 4B) to change rams, perform maintenance, make repairs, inspect, and the like, this can be done and effective control of well pressures can at the same time be maintained. This is done by the use of a latching plug 156 (FIGURE 2) which is set in casing hanger seat 157 within the casing supporting assembly 61. The latching plug seals off the well bore against formation pressures and permits the safe removal of blowout control assembly 76. Latches 158 of hole plug 120 engage with a groove or slot 159 in the casing hanger seat. When the blowout control assembly 76 is replaced in position and properly connected to the conductor casing assembly, in the manner already described, the plug can then be removed with a plug releasing device (not shown) inserted through the blowout control assembly. The lower end of the plug releasing device engages the upper grooved mandrel 160 of the hole plug and when hoisted releases the latches and removes the plug.

After segment 138 of the hole has been drilled, casing 155 is run in from vessel 20 through mud return hose 123, blowout control assembly 76, casing supporting assembly 61, and casing 56. A latching type casing hanger 165 (FIGURES 7A, 7B, 8B) is installed on the upper end of the casing string 155 and this hanger supports the casing string in tension from its support at casing hanger seat 157 provided in the casing supporting assembly 61. A safety joint mandrel 90a, identical except for size with the mandrel 90 of safety joint 65 of FIGURE 3, is attached to the upper end of casing hanger 165, providing a means for connecting other devices to the upper portion of casing string 155. The casing string with hanger 165 attached thereto is lowered into position by a landing assembly (not shown) which is connected to the casing string with the safety joint. Above the safety joint on the landing assembly, there is a sufficient length of casing (not shown) identical in size to the casing string 155 being run to provide the same diameter pipe through the ram type blowout preventer 105. Above this upper length of casing, drill pipe 70 is connected to the landing assembly by means of the sliding connection 148, previously described. With the casing string resting in the hanger seat, drilling fluid is circulated down through casing 155 from vessel 20 and up the annulus around casing 155 and is returned to the vessel through a plurality of circularly spaced side outlet connections 166 below the casing hanger seat 157 in the casing supporting assembly 61. From these side outlet connections, the fluid is conducted to a point above the flanged landing base 62 by tubings 167, which are connected to the mud circulation system aboard vessel 20.

With circulation thus established, the hole can be conditioned for cementing by the circulation of drilling fluid as described for a desirable length of time. The casing can then be cemented back to a point inside the conductor casing, using the same circulation path as that previously described for the drilling fluid. This cement is designated by reference numeral 170, and is below cement 75. Cement inside the casing is displaced with drilling fluid to a desirable point above the lower end of casing string 155. With the cement in place and set the landing assembly can then be removed by disconnecting the safety joint. With cement both inside and outside the casing, it is now possible to remove the blowout control assembly 76 (FIGURES 4A, 4B) and the mud return hose 123 from the well. If it is desirable to drill to a greater depth and to set additional strings of casing, another casing supporting assembly, with the lower part of a safety joint carried at the upper end thereof, and with a guide funnel surrounding the safety joint part, can be secured to the upper end of casing 155 and its hanger 165. The casing setting operation which has been described in connection with casing 155 can be repeated for successively smaller concentric casings as desired. Two or more casings can be supported at seats within assembly 61 in the manner of casing 155, or the casings may be supported successively, each from the preceding casing in the well.

Referring now to FIGURES 7A, 7B, particularly, and also to the other drawings, casing supporting assembly 61 will be more fully described. Assembly 61 includes an elongate tubular lower casing head body 180 having lower threaded socket 181 screwed onto the upper end threads of conductor casing 56. Body 180 is thickened inwardly at its lower end and the previously mentioned conical seat 157 is formed therewithin. An upwardly enlarging adapter mandrel 182 is screwed onto the outwardly threaded upper end of body 180. Mandrel 182 has an upper threaded socket 184 into which is screwed the lower threaded end of lower safety joint mandrel 90 of the safety joint 65, previously described (FIGURE 3).

Casing hanger 165 is seated on seat 157, safety joint mandrel 90a being screwed into a threaded socket at the upper end of the hanger, and casing 155 being supported from the hanger at threads 185 thereof. Hanger 165 has a seat ring 186 movably disposed in a recess around its lower end, and a sealing ring 187 of resilient material, such as rubber, is disposed between the upper end of ring 186 and the upper end of the recess. Weight of casing 155 causes axial compression of ring 187 to form a fluid-tight annular seal around the hanger. A plurality of releasable outwardly biased latches 188 around the hanger above the sealing ring enter the groove 159 to hold the hanger down on seat 157.

Mandrel 90a forms the lower part of a safety joint 65a, which is substantially identical, except for size, with safety joint 65, FIGURE 3. Safety joint 65a has upper part 77a, like part 77 of safety joint 65 except that it has exterior threads instead of an interiorly threaded socket, onto which is screwed an upper casing head body 190 which has spaced interior upwardly-facing conically tapered seats 191, 192 for supporting two additional strings of concentrically disposed casing (shown in FIGURE 7D in a modified arrangement). A safety joint mandrel 90b is connected at the upper end of casing head body 190 and is located inside an upper guide funnel 193 which is also connected to the upper end of the casing head body, for example by welding it thereto. The guide funnel 60 is welded to the upper end of adapter mandrel 182.

The described assembly is lowered into place by a handling string (not shown) consisting of a drill string including a sliding connection and having the upper part of a safety joint at its lower end connected to mandrel 90b.

With the described assembly in place, the blowout preventer assembly 76 shown in FIGURES 4 and 6, or a blowout preventer assembly identical therewith except adapted for higher working pressures, can be connected in the previously described manner to safety joint mandrel 90b, an upper safety joint part 77b being connected at the lower end of the blowout preventer assembly. The mud return hose 123 is now lowered into position and connected as previously described. With the apparatus thus assembled, it is now possible to drill additional hole as desired. With a drilling assembly similar to that previously described, other casings such as strings 195, 196, shown in FIGURE 7D, may be run into the hole and supported by hangers resting on seats 191, 192 of casing head body 190. The apparatus as described will permit the use of four separate strings of casing together with a string of production tubing 197 inside the smallest production casing. Additional strings of casing may be incorporated into the apparatus by the use of large diameter conductor casing. After drilling of the well has been completed and production casing set and cemented, the well can then be completed and produced with apparatus which will rest below the surface of the water.

Referring to FIGURES 7C, 7D, casing hangers 165a, 165b, both of which are of design similar to hanger 165, are provided to support the casings 195, 196, respectively, on seats 191, 192 of body 190. These hangers may have the double hold-down latches 199 as shown, or may have single latches as shown for hanger 165. It is to be understood that this assembly may be provided identically at body 190 in the embodiment of FIGURES 7A, 7B.

Casing hanger 165b for supporting the production string of casing 196 has screwed to its upper end a hanger seat 210 for supporting the production tubing 197. With the production hanger 165b and tubing seat 210 latched into position as shown within the casing head body, the production tubing can then be lowered into position inside production casing 196. The tubing is run with a tubing hanger 211 which has a latching and sealing seat 212 formed at its upper end. The tubing string is lowered into position with a landing string (not shown) attached to the upper portion of the tubing seat 210 with internal left hand pipe threads 213. After the tubing hanger has been landed in its seat, the landing string can be disconnected at the left hand thread connection by suitable rotation of the string, and removed.

A standard type of blank sealing plug (not shown) may now be lowered into the latching and sealing seat 212 within the production tubing hanger 211. Such plugs are latched in place with a setting tool (not shown) supported by a pipe string from the vessel. The pipe string is then removed. This leaves the well bore closed or blanked off, and under control, and permits removal of the mud return hose and blowout control assembly and subsequent installation of a Christmas tree assembly.

Referring now to FIGURES 7C and 8A, 8B, the Christmas tree assembly 215 has a safety joint barrel 77b at its bottom connected to safety joint mandrel 90b, there being a side outlet 217 in the upper portion of barrel 77b, which provides a connection to the annular space therewithin. Attached to this side outlet is a remote operated valve 218 which in turn is connected by a flexible tube 219 leading to a production storage platform or other control station, not shown. Attached above the safety joint barrel 77b, see FIGURE 8A, is a remote operated master valve 221, above which is a fitting 223 having a curved side-branching pipe connection 224 to which is connected a remote operated wing valve 225. Connected to this remote operated wing valve is a production flow line 228 which also leads to a production storage platform, not shown. Lines 219, 228 are constructed of flexible material, such as rubber, for a distance from the underwater well site sufficient to permit raising and lowering the Christmas tree to and from the surface of the water, without placing undue strain on the lines. At other parts, the lines may be constructed of conventional oilfield tubular goods if desired. Extending above fitting 223 is a length of tubing 229 sufficient in length and diameter to be used as a passage for insertion of conventional wire line logging and workover tools. Attached to the upper end of tubing 229 there is a guide funnel 230 inside of which there is a small diameter safety joint mandrel 90c of a safety joint 65c. Guide arms 235, 236 are provided on the Christmas tree, the lower arms 235 at the lower end around the safety joint barrel 77b and the upper arms 236 at the upper end attached to the upper guide funnel 230. The above described assembly is lowered into position with a pipe string (not shown) connected as has been described to the safety joint mandrel 90c in the upper guide funnel. The assembly is guided into position by the guide arms having end eyes about the guide cables. When lowered over the safety joint mandrel 90b of safety joint 65b at the upper end of the casing head body 190, the safety joint barrel 77b attached to the lower end of the Christmas tree assembly automatically connects to the safety joint mandrel. Casing 196 and tubing 197 are sealed off from each other by a sealing barrel 237 within the safety joint barrel as best shown in FIGURE 7C. Barrel 237 is supported by a plurality of the bracket arms 237a welded in radial positions spaced around barrel 237, their outer ends being welded to the interior surface of the mandrel 85b of safety joint part 77b. If a superior seal is desired, a sealing barrel 238 may also be installed within the Christmas tree and tubing hanger as shown in FIGURE 7C. Sealing barrel 237 has interior packing elements 240, 241 disposed in circular recesses which seal about the lower end of a tube 242 threadedly connected to the lower end of the Christmas tree at 243, and about the upper end of the tubing hanger, respectively. Sealing barrel 238 has packing ring 244 and latches 245 which seat and engage at sealing and latching seat 212 of the tubing head. A tubular sleeve 246 may be urged downwardly in a tubular upper end recess 247 of barrel 238 to urge and hold the latches, which have inner tapers, outwardly to latched position. A groove 248 around the top of sleeve 246 allows it to be picked up to release the latches. A seal ring 249 seals between barrel 238 and tube 242. Barrel 238, of course, cannot be put into place until after the blank plug, described as seated at latching and sealing seat 212, has been removed.

The Christmas tree being in place as described, the blank plug in the latching seat within the tubing hanger can then be retrieved by means of a wire line operated retrieving tool so that barrel 238 can be set in place. It is now possible to install additional control apparatus such as blowout preventer 252 above the Christmas tree by attachment to the safety joint mandrel 90c within guide funnel 230 as shown in FIGURE 8A, preventer 252 including guide arms 253, 254 and funnel 255 of the type heretofore described. With such control apparatus in position, together with the control afforded by the remote operated valves 221, 225 of the Christmas tree, the well can be perforated, swabbed, logged, and fractured, and worked upon in any other known manner possible with conventional wire line tools, all of this being accomplished from a vessel at the water surface.

After the well has been completed and flow tested, if desired, the Christmas tree can then be closed up at the top and the drilling vessel removed from the well site. This is done as follows: All tools are removed from the well, and the blowout preventer 252 is removed by disconnection at safety joint 65c, and raised to vessel 20. (These steps are carried out after the Christmas tree master valve 221 has been closed.) The top of the Christmas tree is closed by a blank safety joint barrel 258 having a threaded-through wire line release cable 259 (see FIGURE 9). The blank safety joint barrel 258 has guide arms 260 of the type heretofore described and is run in and latched in place with a combination setting and releasing tool 262 supported by a pipe string 263 extending from vessel 20. With the Christmas tree closed by barrel 258 locked with mandrel 90c, the pipe string and setting and releasing tool are brought back aboard the vessel, and the upper ends of the guide cables 67, 68, together with the release cable 259 are attached to a suitable marker buoy 260. Cables and marker buoy are then cast away from vessel 20. The tubular conduits 218a, 221a, 225a, or hoses, through which hydraulic fluids for operation of the remote operated valves 218, 221, 225 are supplied, may be connected to buoy 260 as shown in FIGURE 10 for operation by facilities aboard a vessel floated to the buoy, or may extend to a base of operations on shore or afloat (not shown) having such facilities. The mooring lines of the vessel can then be taken in, and the vessel floated away from the well site with the marker buoy serving to indicate the location of the well site and thereby providing means of relocating and retrieving the guide cables and re-entering the well, the marker buoy not being fixed, and thus not constituting a hazard to navigation.

Figure 12:
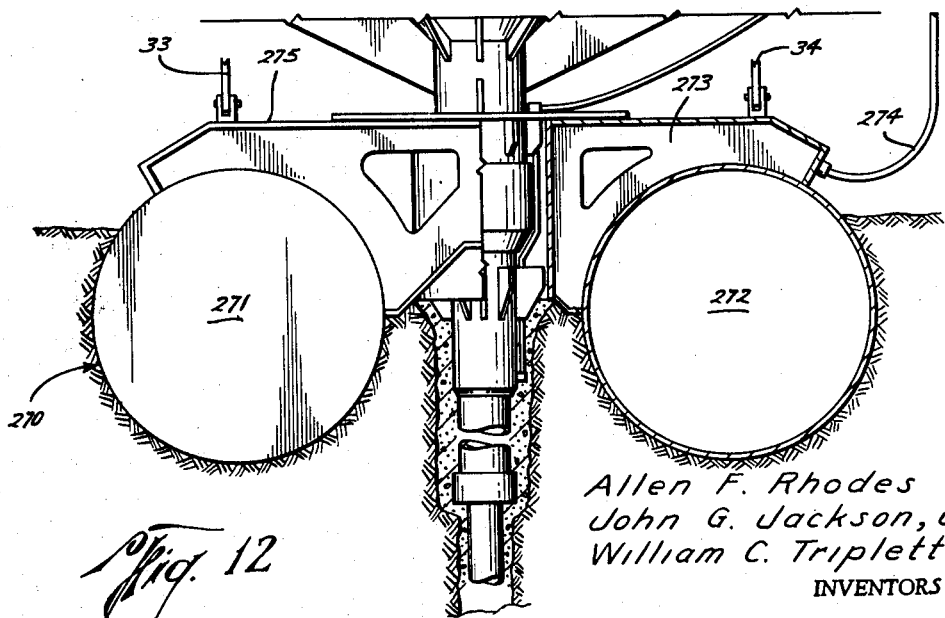
FIGURE 12 is another partial elevation, partly in vertical section, showing another modified form of the part of the apparatus shown in FIGURE 11.

In FIGURES 11 and 12 there are shown alternate forms of submarine bases for the well which may be used instead of the base shown in FIGURES 1–2. The base shown in FIGURE 11 is of circular fabricated steel truss construction, having upper and lower ring elements 265, 266 and connecting vertical angular bracing elements 267, 268. This base may be enclosed with steel plate welded on to close the framework in order to make the base buoyant.

The second alternative form of base is shown in FIGURE 12. This form of base is of the type disclosed in copending application for United States Letters Patent, S.N. 652,756, filed April 15, 1957, by William C. Triplett, and entitled "Method and Apparatus for Drilling Offshore Wells." Referring to FIGURE 12, the base 270 includes buoyant drums 271, 272, any number of which may be provided. A frame 273 connects the drums, and control line 274 symbolically represents means extending to vessel 20 for exhausting the drums of water ballast to make them buoyant for allowing them to be filled with water ballast to make them partially buoyant or non-buoyant, so that the drums may be completely controlled from the surface. Such means is conventional. The lines 33, 34 (see FIGURE 2) are secured to the base for lowering of the base from vessel 20 and for lowering of the initial equipment to the base, as in the other embodiment. Frame 273 provides an upper surface 275 upon which the ring 62 is landed.

Referring again to FIG. 11, an upper structure is shown attached to the framework base. This structure includes vertical members 280 reinforced by diagonal braces 281, the entire structure being unitarily welded together and to ring 265. A cylindrical ring 282 of tubular cylindrical shape formed of steel plate is welded within the upper ends of the vertical members 280. An upwardly diverging funnel 283 also formed of steel plate serves to guide the entrance of the blowout control assembly 76, or other equipment, to within the frame structure. The centering arms 286, of which a plurality are provided in radial disposition, have vertical tubular end parts 287 which carry outwardly facing springs 288, the springs engaging the interior of ring 282 to hold the blowout preventer assembly in centered position. The rods 289 and turnbuckles 290 provide means for interconnecting and supporting the blowout preventer arms 101 (FIGURE 4B) two of the arms 286 which engage the guide cables 84, 85, the arms 286 engaging the guide cables 67, 68 at end parts 287 which slidingly surround the cables.

The apparatus of this invention also provides for access to the annular spaces between casing strings and between tubing and casing strings. Referring particularly to FIGURES 7A and 7B, lateral ports 292 and 293 are provided through the wall of casing head body 190 at points below each of the casing hanger seats 191, 192. These ports and their relationship to the annular spaces between casing strings are further illustrated in FIGURES 7C and 7D. Ports 292, 293 are connected to tubes 294, 295, respectively, which, in turn, are connected to a remote annular access connection device 297 through hydraulic operated valves 298, 299 (FIGURES 7A, 7B). The annular access connection 297 includes a cylindrical body 301 having a series of circular annular receptacles or seats 303–306 of successively decreasing diameter and arranged in a stair-step manner. The uppermost circular receptacle 303 has a sidewall groove 307 into which extendable latching lugs of a mandrel 308 seat. The successively lower circular receptacles have circular grooves 310–312 around their vertical sides to which are connected fluid passages 313–315 through body 234. Fitting into and sealing within all of the receptacles is the mandrel 308 having shoulders of successively increasing diameter corresponding with the receptacles or seats 303–306. O-ring seals are installed in grooves around each stairstep wall portion of mandrel 308 to seal about each groove 310–312. These O-rings serve to seal-off the grooves within the successively smaller circular receptacles, one from the other, thereby providing continuity between fluid passages 313–315 within body 301 and respective fluid passages 317–319 through mandrel 308.

Body 301 is mounted upon a horizontal plate 301a which has an opening disposed about the tubular lower part of funnel 193, plate 301a being secured thereto as by welding. A reinforcing, or brace, plate 193a is disposed in a vertical plane and is welded at its edges to funnel 193, plate 301a, and to a side of body 301. Mandrel 308 is lowered on a pipe string or wire line (not shown) and positioned over body 301 by an offset guide arm (not shown) riding along guide cables 84 and 85. The offset guide is similar to the several guide arms already described (guide arm 43, FIGURE 1; guide arms 100, 130, FIGURE 4A, etc.). However the offset guide includes a lateral arm extending not to the guide cables but to a point centered of body 301, so that mandrel 308 is guided into body 301.

Once in position a portion of the weight of the lowering apparatus is placed on a latch actuator 320, causing the latching lugs of mandrel 308 to engage groove 307. With the mandrel thus in place, hydraulic fluid is pumped under pressure through hoses 322-324 into the passages in mandrel 308 and body 301, and on into the hydraulic opening valves 298, 299 to open them. When these valves are opened, access to the desired annular spaces is provided through the connection and up into hoses 323, 324 which, with pressure hose 322, extend to vessel 20. With access thus provided to the annular spaces between the casing strings and tubing, pressures in these spaces can be determined or bled off, fluid or cement may be pumped into the spaces, and other operations in connection with these spaces carried out.

After such operations have been carried out, and if it is desirable, the annular spaces can again be sealed off. To do this, the hydraulic pressure on the access valves is released, allowing these valves to be closed by automatic spring actuators. With the access tubes 323, 324 thus closed, mandrel 308 can be unlatched and raised to the surface by hoisting on the mandrel supporting apparatus. The latch actuator 320 is raised, permitting the latch lugs to recede into the mandrel body by the action of return springs (not shown). The mandrel 308, together with its associated equipment, is then raised to vessel 20 by the handling apparatus.

To protect the interior sealing surfaces of connection body 301 from corrosive action and marine growth, a blank mandrel (not shown) may be sealed and latched in place within connection body 301 in a manner similar to that described for mandrel 308. The blank mandrel is similar in construction to mandrel 241 except that it has no internal fluid passages or hoses connected between it and the vessel. When the blank mandrel has been latched in place, the handling apparatus may be released from handling string connection groove 329 around latch actuator 320 and retrieved to the surface, leaving the connection closed and sealed from exposure to corrosion and marine growth. Re-entry to the connection is gained by lowering the handling apparatus back over the latch actuator and removing the blank mandrel.

Referring again to FIGURES 7C, 7D of the drawings, the alternative embodiment wherein the outer, or surface, casing in the well is of reduced size has not yet been entirely described in detail. The first described embodiment, that of FIGURES 7A, 7B, includes surface casing string 56 within which is disposed concentrically a second casing string 155. Also, as has been described, the casing strings 195, 196 and the tubing string 197 may be supported within casing string 155, FIGURES 7A, 7B, in the manner shown in FIGURES 7C, 7D, so that the complete embodiment of FIGURES 7A, 7B will include casing strings 56, 155, 195, 196 and tubing string 197, or as many of these as it is desirable or appropriate to include.

In the FIGURE 7C, 7D embodiment, casing string 155, which is of smaller size than casing string 56 (FIGURE 7B), is the outermost, or surface, casing string to which the supporting means for inner casing strings and the tubing string are connected. In the FIGURE 7C, 7D embodiment, the casing and tubing support assembly is lowered into place attached to the upper end of casing string 155, whereas in the FIGURE 7A, 7B embodiment, assembly 61 was lowered into place connected to the larger casing string 56.

In FIGURES 7C, 7D, there is shown an adapter ring 331, or mandrel having threaded socket formation 332 at its lower end and having external threaded pin formation 333 of larger diameter at its upper end. Socket 332 is screwed onto the upper end threads of string 155. Upper casing head body 190 having internal seats 191, 192, previously described in connection with FIGURES 7A, 7B, is threaded onto the pin 333 of adapter 331.

Hangers 165a, 165b have already been described in connection with the FIGURE 7A, 7B embodiment, as has also the remainder of the apparatus shown in FIGURES 7C, 7D.

While preferred embodiments of the invention have been shown and described, many modifications of the methods and apparatus according to the invention may be made by a person skilled in the art without departing from the spirit of the invention, and it is intended to protect by Letters Patent all forms of the invention falling within the scope of the following claims.

We claim:

1. Well completion apparatus for underwater wells, comprising a casing extending from the top of the well downwardly thereinto, connection means carried at the upper end of said casing, valve means having cooperable connection means at its lower end cooperatingly joined with said casing connection means, handling means extending from said connection means to the water surface, said casing connection means and said valve means having cooperable connection means being connectible and disconnectible by manipulation of said valve means by said handling means provided to extend therefrom to the water surface so that said valve means may be connected and disconnected from the water surface, a pipeline terminating at a point spaced along the floor of the body of water from the well, a flexible conduit means connected with said valve means and extending along the floor of the body of water and connected with said pipeline for fluid flow from within said casing through said valve means into said pipeline, said flexible conduit means being of sufficient length to permit movements of said valve means between its said connection at said casing connection means and the water surface, whereby said valve means may be connected to and disconnected from said casing from the water surface and moved between the water surface and the well by said handling means without disconnection of said connection through said flexible conduit means between said valve means and pipeline.

2. The combination of claim 1, said valve means comprising a master valve means having said cooperable connection means at its lower end, a member having a vertical flow passage and a lateral passage therefrom connected to surmount said master valve means, a wing valve means connected to said lateral passage, a connection between said wing valve means and said flexible conduit means, closure means in said vertical passage above said lateral passage removable from the water surface by said handling means, hydraulic operation means for said master valve means and for said wing valve means disposed adjacent thereto, hydraulic conduit means extending from said hydraulic operation means to a location remote from the well for operation of said valve means to control pressures within and fluid flow of the well from said remote location.

3. The combination of claim 1, including relatively heavy base means including penetrating means at its lower surface for penetrating the underwater surface of the earth around said casing, and means connecting said base means to said casing below said connection means at the upper end of said casing.

4. Combination of claim 1, including flexible line means extending from said connection means at the upper end of said casing to the water surface, said cooperable connection means of said valve means having slidable connection with said flexible line means whereby said valve means when disconnected from said casing connection means may be moved by said handling means slidingly along said flexible line means between the water surface and the well.

5. Combination of claim 4, including float means at the water surface supporting the upper end of said flexible line means.

6. Combination of claim 2, including flexible line means extending from said connection means at the upper end of said casing to the water surface, said cooperable connection means of said valve means having slidable connection with said flexible line means whereby said valve means when disconnected from said casing connection means may be moved by said handling means slidingly along said flexible line means between the water surface and the well; and including float means at the water surface supporting the upper end of said flexible line means; said location remote from the well to which said hydraulic conduit means extend being at the water surface and said float means also supporting the upper end of said hydraulic conduit means at the water surface.

References Cited by the Examiner

UNITED STATES PATENTS

| | | | |
|---|---|---|---|
| 1,057,789 | 4/13 | Wigle | 166—27 |
| 1,175,725 | 3/16 | Dunbar | 175—10 |
| 1,381,645 | 6/21 | Kinniear | 166—27 |
| 1,691,715 | 11/28 | Hansen | 175—10 |
| 2,077,044 | 4/37 | Grace et al. | 166—66.5 |
| 2,171,672 | 9/39 | Plummer | 175—210 X |
| 2,187,871 | 1/40 | Voorhees | 175—8 |
| 2,512,783 | 6/50 | Tucker | 175—6 |
| 2,606,003 | 8/52 | McNeill | 175—7 |
| 2,808,229 | 10/57 | Bauer | 175—7 |
| 2,917,281 | 12/59 | Kofahl | 175—7 |
| 2,923,531 | 2/60 | Bauer et al. | 175—7 |
| 2,962,096 | 11/60 | Knox | 166—75 |
| 3,025,916 | 3/62 | Frick | 175—7 |

CHARLES E. O'CONNELL, *Primary Examiner.*

UNITED STATES PATENT OFFICE
CERTIFICATE OF CORRECTION

Patent No. 3,186,486                                June 1, 1965

Allen F. Rhodes et al.

It is hereby certified that error appears in the above numbered patent requiring correction and that the said Letters Patent should read as corrected below.

Column 1, before line 10, insert the following paragraph:

This application is a continuation-in-part of application Ser. No. 695,955, filed by the same applicants on Nov. 12, 1957, and now abandoned.

Signed and sealed this 19th day of October 1965.

(SEAL)
Attest:

ERNEST W. SWIDER                             EDWARD J. BRENNER
Attesting Officer                                 Commissioner of Patents